United States Patent Office

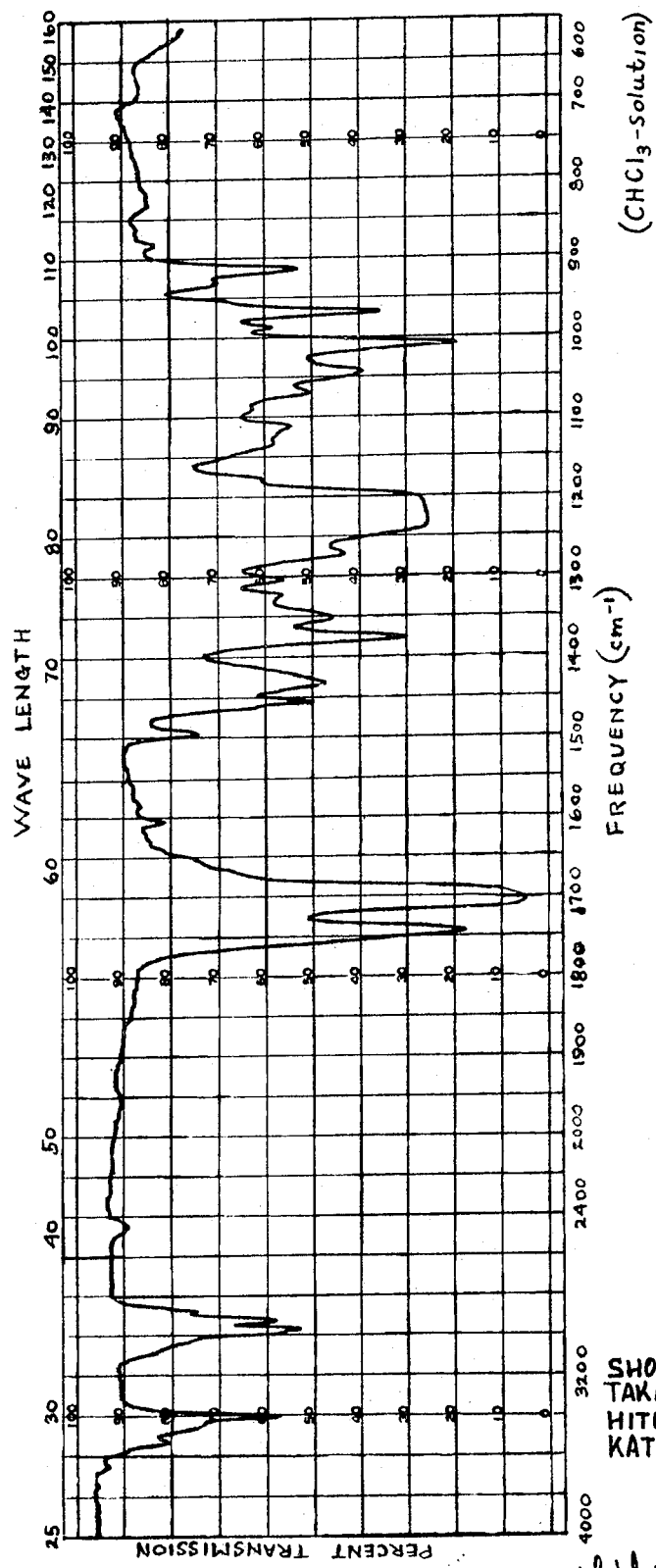

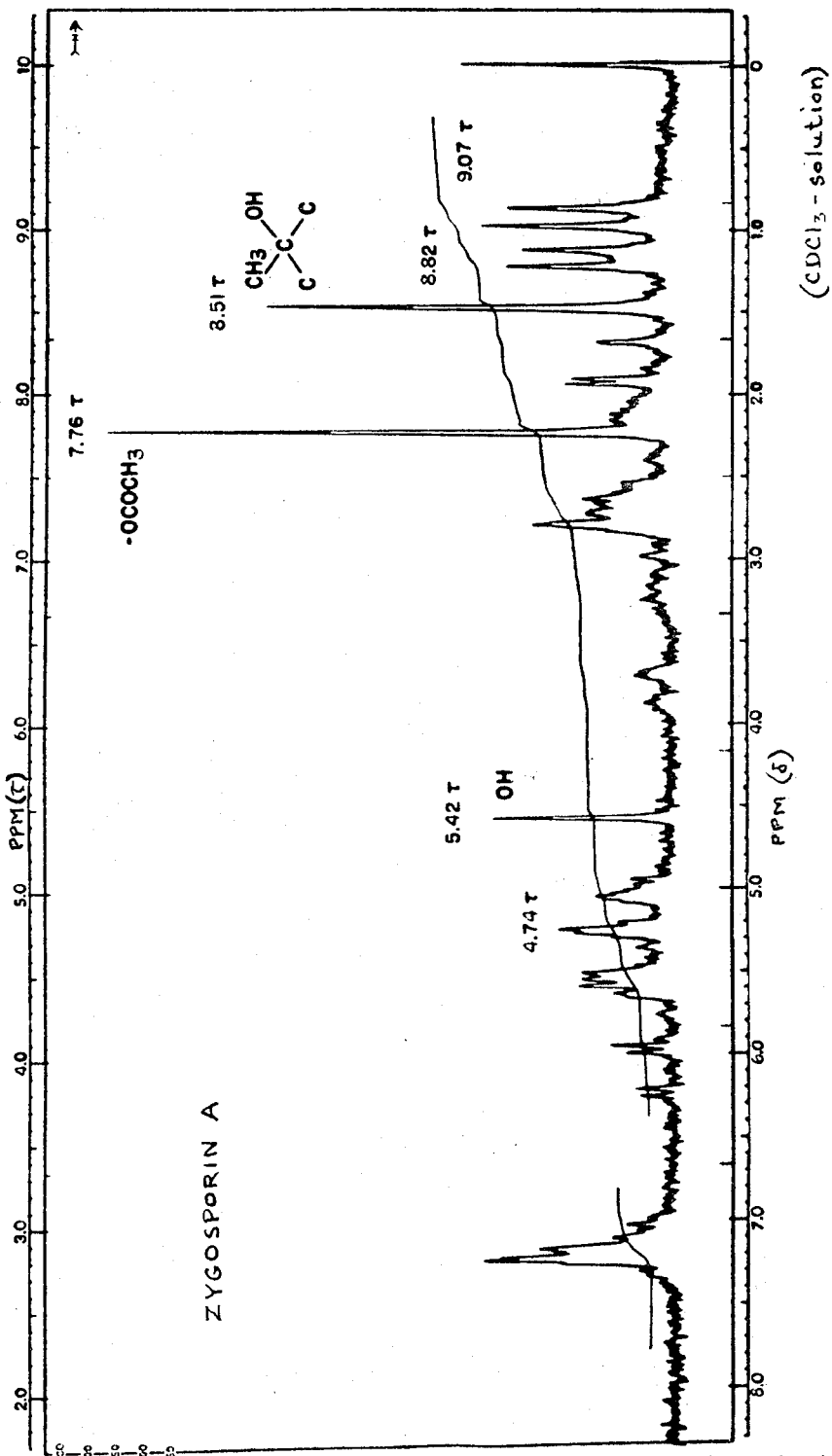

3,660,568
Patented May 2, 1972

3,660,568
ANTI-INFLAMMATORY SUBSTANCE, ZYGOSPORIN A, AND PRODUCTION THEREOF
Shohei Hayakawa and Takashi Matsushima, Amagasaki-shi, Hitoshi Minato, Toyonaka-shi, and Katsumi Hirose, Nishinomiya-shi, Japan, assignors to Shionogi & Co., Ltd., Osaka, Japan
No Drawing. Filed Mar. 25, 1968, Ser. No. 715,913
Int. Cl. A61k 21/00
U.S. Cl. 424—122                                                7 Claims

ABSTRACT OF THE DISCLOSURE

An anti-inflammatory agent, zygosporin A, is prepared by aerobically culturing a zygosporin-producing strain of Zygosporium masonii or of Zygosporium mycophilum in an aquous nutrient medium, and recovering the accumulated agent from the fermentation broth. The antiinflammatory agent is advantageously administered orally or subcutaneously.

---

Figure 1:
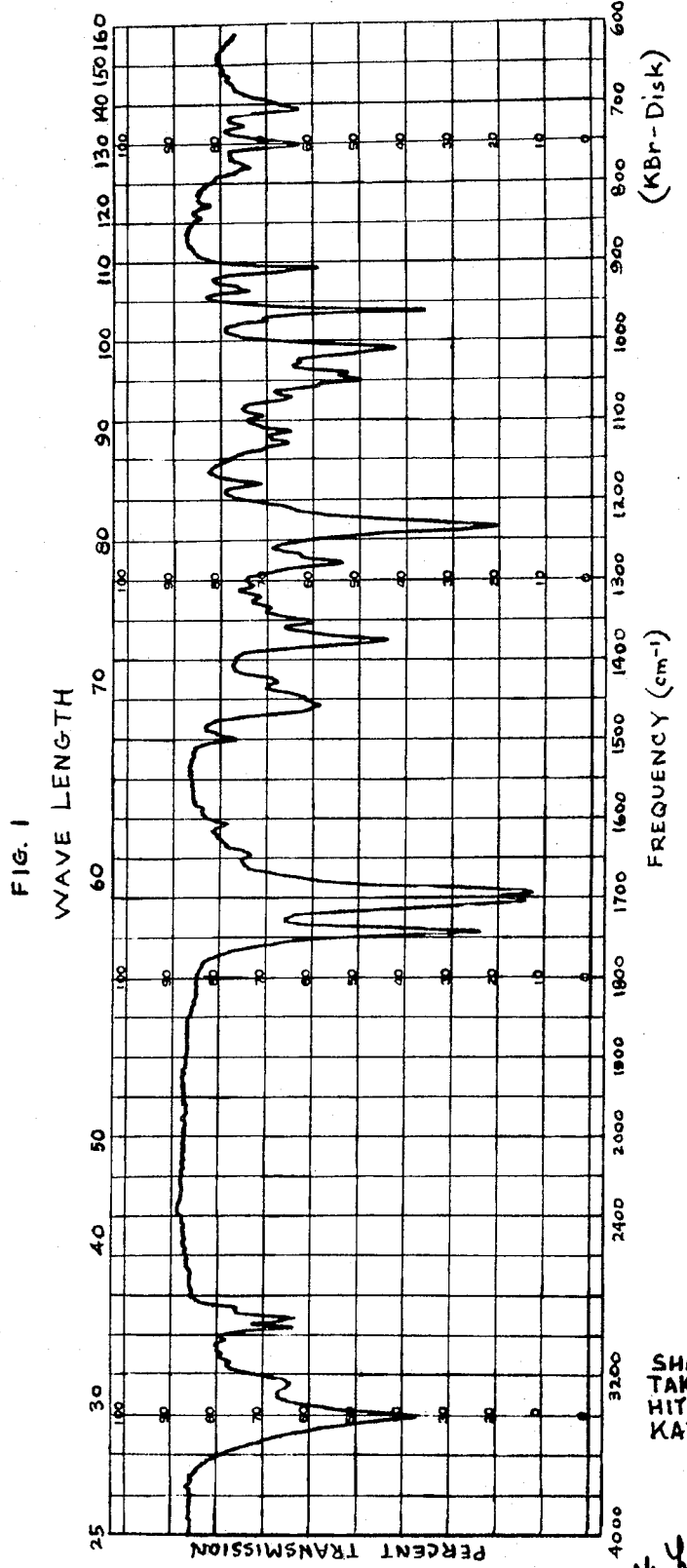

This invention relates to a fermentation product and production thereof. More particularly, the invention relates to an anti-inflammatory substance produced fermentatively and designated "zygosporin A," and production thereof. It relates also to a method of treating inflammations and edemata.

As anti-inflammatory agents, there have been mostly used adrenocorticoids such as cortisone, hydrocortisone, prednisone and prednisolone. However, these adrenocorticoids generally exhibit undesirable side actions, when continuously administered for a long time. Because of the drawback present in adrenocorticoids, there have been proposed and made available some non-adrenocortical anti-inflammatory agents. But these non-adrenocortical compounds are generally inferior to the said adrenocorticoids in anti-inflamatory activity. Therefore, it has been desired to embody other non-adrenocortical compounds possessing a high anti-inflammatory activity at least equal to that of the adrenocorticoids.

In the course of seach for new fermentation products, Zygosporium species indexed MFC-612 and MFC-702 in the collection of Shionogi Research Laboratory, Shionogi & Co., Ltd., Osaka, Japan, and on deposit with the American Type Culture Collection under the accession numbers ATCC Nos. 20011 and 20012, respectively, have been found to produce a crystalline substance having a potent anti-inflammatory activity.

Accordingly, a fundamental object of the present invention is to provide a fermentation product, zygosporin A. Another object of the present invention is to provide a process for the fermentative preparation of zygosporin A. A further object of the present invention is to provide a preparation for anti-inflammatory administration which includes the said zygosporin A as an active ingredient. A still further object of the present invention is to provide a utilization method of the said zygosporin A as an anti-inflammatory agent. These and other objects which will be apparent to those conversant with the art to which the present invention pertains from the subsequent description, are achieved by the present invention.

Zygosporium MFC-612 has been isolated from a dead leaf sample of Daphniphyllum macropodum collected at Kyoto, Japan, in 1965, and shows the following morphological characteristics:

The growth on potato-sucrose agar is medium, and the colony is white felt-like with a dark gray funiculose central area on which sporulation occurs. The conidiophores are erect and are composed of three parts: (1) an erect basal branch being composed of 1 to 3 cells is colored pale brown and is 5 to 20 by 2 to 2.5 microns in size. (2) A middle part borne on the basal branch is an erect chain of 2 to 4 vesicles attached end to end. The vesicle is colored dark brown, 7 to 12 microns long, clavate when viewed from the front, 2 microns wide below and 4 microns wide above. When viewed laterally, it is shaped somewhat like the blade of a bill-hook with a rostrum 2 to 4 microns long. The lateral wall is thick except where an adjacent vesicle is attached. The rostrum bears two sporogenous cells which are divergent, upwardly curved, ovoid-acuminate, hyaline and 4 to 6 by 2 to 2.5 microns in size. (3) A long hyaline apical hypha is at the end of the conidiophore, 20 to 30 by 1 to 2 microns in size, continuous and swollen above to an oval bulb about 2.5 to 3.5 microns in diameter. The conidia are produced singly from the apex of each sporogenous cell, and they are dry, oval, hyaline, delicately warted and 6 to 9 by 4 to 6 microns in size.

On the basis of these characteristics, Zygosporium MFC-612 has been identified to Zygosporium masonii Hughes (S. J. Hughes: Mycol. Pap., C.M.I., 44, 15 (1951)). The presently isolated strain, i.e. Zygosporium masonii MFC-612, has been deposited with the American Type Culture Collection and given an accession number ATCC No. 20011. It is preferred that Zygosporium masonii MFC-612 (ATCC No. 20011) be preserved on potato-carrot agar at 10° C. with transfer every 3 months.

On the other hand, Zygosporium MFC-702 has been isolated from a dead leaf sample of Osmanthus ilicifolius collected at Asakawa, Tokyo, Japan, in 1966, and shows the following characteristics:

The growth on potato-sucrose agar is relatively slow, and the colony is colored pale brown. The mycelia are composed of hyaline to subhyaline, branched and septate hyphae, 1 to 3 microns wide. Falces are borne directly on the mycelium as a lateral branch. The stalk which supports a vesicle is cylindrical, 4 to 16 by 2 to 3 microns in size, 0 to 1 septate and colored brown. The vesicle is colored dark brown, obpyriform, produced into a unilateral rostrum at the apex, 13 to 15 microns long, 6 to 8 microns in its greatest breadth when viewed from the front and 4.5 to 6 microns in its greatest breadth when viewed laterally. Three divergent sporogenous cells on the apex of the rostrum are hyaline, ovoid-acuminate, sometimes bent and 4 to 6 by 3 to 4 microns in size. The sterile cell borne at the tip of the vesicle is cylindrical, with rounded, slightly swollen and often torn end and 5 to 8 by 2 to 3 microns in size. The conidia are produced at the apex of each sporogenous cell, oval and 8 to 10 by 6 to 7 microns in size.

On the basis of these characteristics, Zygosporium MFC-702 has been identified to Zygosporium mycophilum (Vuill). Sacc. (S. J. Hughes: Mycol. Pap., C. M. I., 44, 9 (1951)). The presently isolated strain, i.e. Zygosporium mycophilum MFC-702, has been deposited with the American Type Culture Collection and given an accession number ATCC No. 20012. It is preferred that Zygosporium mycophilum MFC-702 (ATCC No. 20012) be preserved on potato-sucrose agar under the same condition as mentioned above for Zygosporium masonii MFC-612 (ATCC No. 20011).

It is to be understood that for the production of zygosporin A this invention is not restricted to the use of the above described two srains, i.e. Zygosporium masonii MFC-612 (ATCC No. 20011) and *Zygosporium mycophilum* MFC-702 (ATCC No. 20012). The same results are obtainable by the use of other strains which conform to the same species of the above typical strains. The invention also encompasses the use of natural or artificial mutants or variants produced from the described organisms. The artificial production of mutants or variants can be accomplished by a conventional operation such as with X-rays, ultraviolet radiation and nitrogen mustards.

In accordance with one aspect of the present invention, the anti-inflammatory substance, zygosporin A, is produced during cultivation of the zygosporin-producing strain of *Zygosporium masonii* or *Zygosporium mycophilum* or any of the other aforesaid strains, mutants or variants in an aqueous nutrient medium at a temperature of about 25 to about 32° C., preferably 27 to 29° C., under aerobic conditions. The composition of this nutrient medium can be varied over a very wide range. Essentially what is required is a carbon source, a nitrogen source and inorganic elements. Examples of suitable carbon sources are starch, glucose, glycerol, dextrin, maltose, fructose, sucrose, lactose, mannitol and molasses. Suitable sources of nitrogen for the fermentation process include meat extracts, peptone, corn steep liquor, soybean meal, peanut meal, wheat gluten, cotton seed flour, casamino acid (acid hydrolyzate or casein), NZ amine (enzymatic hydrolyzate of casein), yeast extracts, ammonium sulfate, ammonium carbonate and ammonium chloride. Examples of suitable sources of inorganic elements are mineral salts such as sodium chloride, potassium chloride, calcium carbonate and potassium phosphate. The nutrient medium may or may not be adjusted to about pH 7.0 prior to inoculation of the microorganism. If excessive foaming is encountered, anti-foaming agents such as vegetable oils, lard oil and polypropyleneglycol can be added to the fermentation medium prior to or in the course of the fermentation. The maximum yields of the anti-inflammatory substance, zygosporin A, can be obtained within about 50 to about 150 hours, usually about 70 to about 100 hours, of fermentation under optimum conditions of temperature and aeration.

Generally, the objective substance, zygosporin A, is mainly accumulated in the fermentation medium. After growth of the microorganism, the mycelium is removed from the fermentation broth by using standard equipments such as filter-presses and centrifuges, and then zygosporin A is recovered from the filtrate by a per se conventional separation procedure such as a solvent extraction procedure and an adsorption procedure. If necessary, the collected mycelia can also be subjected to a solvent extraction procedure, because the active product is contained to some extent in the mycelia. Suitable solvents for extraction and elution of the active component include methanol, ethanol, propanol, butanol, acetone, dimethylformamide, dioxan, tetrahydrofuran, ether, ethyl acetate, butyl acetate, amyl acetate, chloroform, methylene chloride, dichloroethane, trichloroethane, benzene and the like. Examples of suitable adsorbents are diatomaceous earth (commercially available e.g. as Celite or Hyflo-Super-Cel), silicic acid, silica gel, activated carbon and the like. A combination of solvent extraction and crystallization by concentration is usually adopted. For instance, the filtrate of the cultured broth is extracted with a suitable water-immiscible organic solvent such as ethyl acetate and chloroform and the extract is concentrated to precipitate the active compound as crude crystals.

The thus-obtained crude active component is further purified by suitable operations such as recrystallization, chromatography and the like. Examples of suitable recrystallization solvents are acetone, methanol and ethanol. The preferred chromatographic adsorbents are silicic acid, silicia gel and the like.

The anti-inflammatory substance, zygosporin A, is constituted by colorless needle-like crystals melting at 268 to 270° C. with decomposition, when recrystallized from acetone. It is soluble in methanol, ethanol, chloroform, methylene chloride, acetone, dimethylformamide, dioxan, ethyl acetate and pyridine, slightly soluble in ether and benzene, but insoluble in petroleum ether and water. It behaves as a neutral substance.

The elementary analytical data of zygosporin A is as follows:

| | Percent |
|---|---|
| Carbon | 71.00 |
| Hydrogen | 7.29 |
| Oxygen | 18.93 |
| Nitrogen | 2.76 |

The compound has a molecular weight of about 500 by the vapor pressure lowering method. The molecular weight has been confirmed to be 507 by mass spectrometry. On the results of the above analyses, the compound has a molecular formula of $C_{30}H_{37}O_6N$. The specific rotation of zygosporin A is $[\alpha]_D^{25} = -7.5°$ ($\pm 0.6°$) (c.=0.55% in dioxan). Zygosporin A shows no characteristic absorption band in the ultraviolet region. The infrared absorption spectrum of zygosporin A, run as potassium bromide disk, shows the following frequencies (S=strong): 3404(S), 3240, 1742(S), 1703(S), 1693(S), 1645, 1605, 1498, 1456, 1427, 1375, 1351, 1277, 1233(S), 1178, 1127, 1112, 1049(S), 1039, 1009(S), 962(S), 936, 907(S), 780, 751(S), 726 and 706(S) cm.$^{-1}$ (shown in the accompanying drawings, FIG. 1). Further, the spectrum run as chloroform solution shows the following frequencies (S=strong): 3409(S), 1742(S), 1702(S), 1065, 1495, 1455, 1435, 1371, 1350, 1322, 1302, 1270, 1111, 1069, 1043, 1006(S), 966(S) and 911(S) cm.$^{-1}$ (shown in the accompanying drawings, FIG. 2). The nuclear magnetic resonance spectrum of zygosporin A, when determined in deuterochloroform (CDCl$_3$), shows the following signals (s=singlet, d=doublet, m=multiplet, J=coupling constant): 9.07 (d, J=6.8, CH$_3$), 8.82 (d, J=6.3 CH$_3$), 8.51

7.76 (s, CH$_3$COO—), 6.23

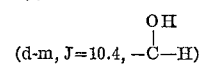

5.42 (s), 4.95 (m. 1H), 4.75 (m), 4.43 (m), 4.02 (d, J=3.1), 3.76 (d, J=3.1) and 2.77 (m) τ (shown in the accompanying drawings, FIG. 3).

Zygosporin A thus produced possesses a high anti-inflammatory activity. For instance, edema inhibition activity of zygosporin A, when administered orally, was examined in rats, and the results are shown in the Table 1, in contrast with a commercially available anti-inflammatory agent, phenylbutazone.

TABLE 1.—EDEMA INHIBITION ACTIVITY

| | | Edema inhibition percentage | |
|---|---|---|---|
| | | Time after administration of the phlogistic agent (hour) | |
| Test Compound | Dose (mg./kg.) | 2 | 3 |
| Zygosporin A | 5.0 | 80.6 | 82.7 |
| Do | 2.5 | 44.3 | 32.7 |
| Do | 1.0 | 19.7 | 2.0 |
| Phenylbutazone | 50.0 | 13.7 | 16.8 |

NOTE.—The rats were orally pretreated with the test compound and then subcutaneously administered the phlogistic agent, 1% carrageenin. The produced edema was measured and compared with that produced without pretreatment. The edema inhibition activity is expressed as percentage inhibition.

In the above Table 1, it is shown that the edema inhibition activity of zygosporin A is about 50 times that of phenylbutazone, when orally administered.

The edema inhibition activity of zygosporin A was further examined in rats by subcutaneous administration, and the results are shown in the Table 2, in contrast with phenylbutazone.

TABLE 2.—EDEMA INHIBITION ACTIVITY

| Test compound | Dose (mg./kg.) | Edema inhibition percentage Time after administration of the phlogistic agent (hour) | |
|---|---|---|---|
| | | 2 | 3 |
| Zygosporin A | 0.5 | 80.7 | 73.4 |
| Do | 0.25 | 64.1 | 50.4 |
| Do | 0.1 | 36.9 | 20.8 |
| Phenylbutazone | 100 | 45.9 | 46.3 |
| Do | 50 | 28.9 | 34.1 |

NOTE.—The rats were subcutaneously pretreated with the test compound and then subcutaneously administered the phlogistic agent, 1% carrageenin. The produced edema was measured and compared with that produced without pretreatment. The edema inhibition activity is expressed as percent inhibition.

In the above Table 2, it is shown that the edema inhibition activity of zygosporin A is more than 500 times that of phenylbutazone, when subcutaneously administered.

Abscess inhibition activity of zygosporin A was investigated in rats, and the results are shown in the following Tables 3 and 4, in contrast with phenylbutazone.

TABLE 3.—ABSCESS INHIBITION ACTIVITY

| Test compound | Total dose (mg./kg.) | Abscess Mean weight (mg.) | Inhibition (percent) |
|---|---|---|---|
| Control | | 2,096±129 | |
| Zygosporin A | 5 | 1,310±86 | 37.5 |
| Do | 10 | 976±70 | 53.4 |
| Phenylbutazone | 25 | 1,815±98 | 13.4 |

NOTE.—Abscess was produced by subcutaneous injection of 2% carrageenin in the sacral region of rats. Then, the test compounds were administered orally. One-half of the total dose was administered immediately after the injection and the remaining half was administered 3 hours later. The rats were sacrificed 24 hours after the injection, and the abscess was dissected and weighed.

TABLE 4.—ABSCESS INHIBITION ACTIVITY

| Test compound | Total dose (mg./kg.) | Abscess Mean weight (mg.) | Inhibition (percent) |
|---|---|---|---|
| Control | | 1,991±87 | |
| Zygosporin A | 1 | 1,728±106 | 13.2 |
| Do | 2.5 | 1,532±76 | 23.1 |
| Phenylbutazone | 50 | 1,516±112 | 23.9 |

NOTE.—Abscess was produced by subcutaneous injection of 2% carrageenin in the sacral region of rats. Then, the test compounds were administered orally. One-half of the total dose was administered immediately after the injection and the remaining half was administered 3 hours later. The rats were sacrificed 24 hours after the injection, and the abscess was dissected and weighed.

From the above Tables 3 and 4, it can be said that Zygosporin A is approximately 20 times as effective as phenylbutazone in the abscess inhibition activity, when orally administered.

Granulation inhibition activity of zygosporin A was examined by oral administration for 6 consecutive days, and the results are shown in the following Tables 5 and 6, in contrast with phenylbutazone.

TABLE 5.—GRANULATION INHIBITION ACTIVITY

| Test compound | Daily dose (mg./kg.) | Granuloma mean weight (mg.) | Granulation inhibition (percent) |
|---|---|---|---|
| Control | | 277.6±15.1 | |
| Zygosporin A | 1 | 264.6±19.3 | 4.7 |
| Do | 2.5 | 265.1±20.5 | 4.5 |
| Phenylbutazone | 25 | 235.6±15.8 | 15.1 |

NOTE.—Granuloma was produced by embedding carrageenin-soaked filter paper-pellet into the lacterovetral region of rats. Then, the test compounds were orally administered once daily for 6 days. Twenty-four hours after the last administration, the rats were sacrificed, and the granuloma was dissected and weighed.

TABLE 6.—GRANULATION INHIBITION ACTIVITY

| Test compound | Daily dose (mg./kg.) | Granuloma mean weight (mg.) | Granulation inhibition (percent) |
|---|---|---|---|
| Control | | 294±8.4 | |
| Zygosporin A | 5 | 263.9±16.9 | 10 |
| Phenylbutazone | 50 | 199.5±11.5 | 34 |

NOTE.—Granuloma was produced by embedding carrageenin-soaked filter paper-pellet into the lacterovetral region of rats. Then, the test compounds were orally administered once daily for 6 days. Twenty-four hours after the last administration, the rats were sacrificed, and the granuloma was dissected and weighed.

From Tables 5 and 6, it can be said that the granulation inhibition activity of zygosporin A is at least several times as strong as that of phenylbutazone.

Furthermore, local exudation inhibition activity of zygosporin A was determined in rats, and the results are shown in the following Table 7, in contrast with phenylbutazone.

TABLE 7.—EXUDATION INHIBITION ACTIVITY

| Test compound | Dose (mg.) | Volume of exudate (ml.) |
|---|---|---|
| Control | | 53.9±3.5 |
| Zygosporin A | 50 | 6.8±0.6 |
| Do | 5 | 15.7±0.8 |
| Do | 0.5 | 26.2±3.0 |
| Phenylbutazone | 50 | 27.6±1.7 |
| Do | 5 | 43.9±4.9 |

NOTE.—Day 1, a volume of 20 ml. of nitrogen gas was injected subcutaneously into the rats to make a pouch, into the cavity of which 0.5 ml. of 10% croton oil was injected. Day 6, the rats were injected with the test compounds locally into the pouch. Day 11, the rats were sacrificed, and the volume of the exudate was measured.

It is clear that the exudation inhibition potency of zygosporin A is approximately 100 times that of phenylbutazone.

The acute toxicity of zygosporin A was investigated in mice, and the median lethal dose value, i.e. $LD_{50}$ value, was determined to be 1.85 mg./kg. subcutaneously and 36.0 mg./kg. orally.

Thus, zygosporin A is remarkably active, when compared with a commercially available non-adrenocortical anti-inflammatory agent. It can be used as a potent non-adrenocortical anti-inflammatory agent. For the preparations of the present invention, there can be employed per se conventional methods.

The active ingredient, zygosporin A, is administered in dosage unit form, as carried by a suitable pharmaceutical carrier, to living bodies particularly for the relief of various inflammations and edemata, e.g. rheumatism. Normally, the preparation is orally administered, although it is just as effective when otherwise administered. It can be orally administered in various dosages such as 0.5, 1, 2.5, 5, 10, 20, 25 or 30 milligrams, although the unit dosage range can vary more broadly from about 0.2 to about 50 milligrams and advantageously from about 1 to about 25 milligrams. It can be added to or otherwise used with various pharmaceutical carriers. By way of exemplification, various solid carriers may be employed such as lactose, mannitol, corn starch, talc and magnesium stearate as well as other tableting aids and fillers. If desired, some other ingredients such as hydrocortisone, prednisolone, aminopyrine, chloroquine, phenylbutazone and the like can be mixed with the said active medicament. The medicinal mixture can then be tableted or encapsulated in a hard gelatine capsule, depending on the commercial unit form desired. Ordinarily, tableting is preferred. The amount of carrier or diluent may vary, according to tablet size desired or whether the dosage is made up in encapsulated form, from zero amount to the maximum amount consistent with the practical limits of bulk for a dosage unit. Normally the carrier with which the medicament is mixed does not exceed about 300 to 500 milligrams.

There is thus provided an effective anti-inflammatory agent which is non-corticoidal and thus is free of the disadvantages of the latter and which is useful, with great advantage vis-a-vis phenylbutazone for example, in treat-

EXAMPLE 1

A seed culture is prepared by the following three-steps procedure: (1) A potato-sucrose-agar slant is prepared by addition of 1.5% of agar to a potato-sucrose medium composed of potato juice (obtained by boiling sliced potato (200 grams) in water (500 milliliters) for 20 minutes), sucrose (10 grams) and water (balance to make the whole to 1 liter). Zygosporium masonii MFC-612 (ATCC No. 20011) is inoculated on the slant and cultivated at 27 to 28° C. for 7 to 10 days, until the sporulation is completed. (2) A potato-sucrose medium (100 milliliters) of the same composition as described above is placed in a 500 milliliters flask, sterilized and inoculated with a suitable amount of the spores from the above slant. The cultivation is carried out at 27 to 28° C. for 3 days with shaking. (3) The cultured broth (50 milliliters) is transferred to a new potato-sucrose medium (500 milliliters), which is composed of the same materials as described above, placed in a 2 liters-flask and previously sterilized. The cultivation is executed at 27 to 28° C. for 4 days, and the thus obtained cultured broth is used as inoculum.

A potato-sucrose medium (20 liters) of the same composition as described above is placed in a 30 liters-jar fermentor, sterilized, and inoculated with the inoculum (500 milliliters) prepared above. The cultivation is performed at 27 to 28° C., for 4 days with stirring (250 rotations per minute) under aeration (20 liters per minute) at a pressure of 0.5 to 0.7 kilogram per square centimeter.

Celite (diatomaceous earth) (500 grams) is added to the cultured broth and centrifuged to obtain the mycelia (1.1 kilograms including the Celite) and the supernatant fluid (17 liters).

To the mycelia is added methanol (1.5 liters) and the mixture is stirred at room temperature for 2 hours. After filtration, the filtrate is concentrated under reduced pressure and the residue is extracted with ethyl acetate. The extract is washed with water, 2 N sodium carbonate solution and water, successively, dried over anhydrous sodium sulfate and evaporated under reduced pressure at 50 to 60° C. to leave an oily residue, which is crystallized by treatment with acetone to give zygosporin A (18.1 milligrams).

On the other hand, the supernatant fluid (17 liters) is extracted with ethyl acetate (3×7 liters). The extract (ca. 20 liters) is washed with water, 2 N sodium carbonate solution and water, successively, dried over anhydrous sodium sulfate and evaporated under reduced pressure at 50 to 60° C. The residue is treated with ether or acetone to give crystalline zygosporin A (277 milligrams). Recrystallization from acetone gives pure zygosporin A as colorless needles, M.P. 268–270° C.

EXAMPLE 2

The procedure according to Example 1 is carried out with Zygosporium mycophilum MFC–702 (ATCC No. 20012) instead of Zygosporium masonii MFC – 612 (ATCC No. 20011), and zygosporin A is recovered from the cultured broth in approximately the same yield as described in Example 1.

EXAMPLE 3

A seed culture is prepared by the following three-steps procedure: (1) A potato-sucrose-agar slant is prepared from potato (200 grams), sucrose (10 grams), agar (5 grams) and water (1 liter). Zygosporium masonii MFC–612 (ATCC No. 20011) is inoculated on the slant and cultivated at 28° C. for 7 days. (2) An aqueous nutrient medium (100 milliliters) containing 3.0% of glucose, 2.0% of peptone and 0.5% of sodium chloride (pH 6.0) is placed in a 500 milliliters-flask, sterilized and inoculated with a suitable amount of spores from the above slant. The cultivation is carried out at 28° C., for 4 days with shaking (140 reciprocations per minute with 7 centimeters amplitude). (3) The cultured broth (30 milliliters) is transferred to a new nutrient medium (700 milliliters), which is composed of the same materials as used in the above process (2), placed in a 2 liters-flask and previously sterilized. The cultivation is executed at 28° C. for 3 days with shaking (300 rotations per minute), and the thus-obtained cultured broth is used as inoculum.

An aqueous nutrient medium (70 liters) containing 3.0% of glucose, 2.0% of peptone and 0.5% of sodium chloride (pH 6.8) is placed in a 100 liters-tank, an anti-foaming agent, P–2000 (polypropyleneglycol, manufactured by Dow Chemical Company) (84 grams) is added, and the mixture is sterilized. The medium is inoculated with the above described inoculum (2.1 liters), and the cultivation is performed at 28° C. for 3 days with stirring (370 to 380 rotations per minute) under aeration (70 liters per minute) at a pressure of 0.7 kilogram per square centimeter.

The cultured broth is centrifuged to remove the mycelia and the supernatant fluid (67 liters) is extracted with ethyl acetate (2×20 liters). The extract is washed with water and evaporated under reduced pressure to give crude zygosporin A (5.7 grams). Recrystallization from acetone gives pure zygosporin A (5.4 grams) as colorless needles, M.P. 268–270° C. (decomp.).

EXAMPLE 4

| | Kilograms |
|---|---|
| Zygosporin A | 12.5 |
| Lactose | 20.0 |

The foregoing are mixed and granulated with a 10% acacia solution and dried. The granule is forced through a 16 mesh screen, and thereafter is mixed with the following:

| | Kilograms |
|---|---|
| Sodium lauryl sulfate | 0.20 |
| Magnesium stearate | 1.00 |
| Amylum solani, q.v. to 37.50. | |

This mixture is tableted in the usual way to give 1,000,000 tablets. Each tablet weighing 37.5 milligrams contains 12.5 milligrams of the active ingredient.

EXAMPLE 5

| | Kilograms |
|---|---|
| Zygosporin A | 0.50 |
| Lactose | 8.97 |
| Cornstarch | 3.48 |
| Magnesium stearate | 2.60 |

The foregoing are mixed together and slugged. The slugs are crushed and passed through a 30 mesh screen. The resulting granules are mixed with magnesium stearate (2.45 kilograms) and tableted in the usual way to give 100,000 tablets. Each tablet weighing 180 milligrams contains 5.0 milligrams of the active ingredient.

What is claimed is:

1. Zygosporin A, of colorless needle-like crystalline form and having elementary analytical data, by weight as follows:

| | Percent |
|---|---|
| Carbon | 71.00 |
| Hydrogen | 7.29 |
| Oxygen | 18.93 |
| Nitrogen | 2.76 | a molecular weight of 507; a molecular formula $$C_{30}H_{37}O_6N$$

an apparent melting point of 268–270° C., (decomp.); an optical rotation of $[\alpha]_D^{25} = -7.5$ ($\pm 0.6°$) when dissolved in dioxan (c.=0.55%); and showing an infrared spectra as in FIG. 1 and FIG. 2 and a nuclear magnetic resonance spectrum as in FIG. 3 of the accompanying drawings.

2. Method of treating inflammation and edema in humans which comprises administering to said human an effective dose for treating inflammation and edema of the zygosporin A as defined in claim 1.

3. Method of treating inflammation and edema in humans which comprises administering orally to said human an effective dose for treating inflammation and edema of the zygosporin A of claim 1.

4. Method of treating inflammation and edema in humans which comprises administering subcutaneously to said human an effective dose for treating inflammation and edema of the zygosporin A of claim 1.

5. A process for the production of zygosporin A as defined in claim 1, which comprises cultivating a zygosporin-producing microorganism selected from the group consisting of *Zygosporium masonii* (ATCC No. 20011) and *Zygosporium mycophilum* (ATCC No. 20012) in an aqueous nutrient medium at a temperature of about 25 to about 30° C. for about 50 to about 150 hours under aerobic conditions and recovering the accumulated antiinflammatory substance from the fermentation broth.

6. The process according to claim 5, wherein the zygosporin-producing microorganism is *Zygosporium masonii* (ATCC No. 20011).

7. The process according to claim 5, wherein the zygosporin-producing microorganism is *Zygosporium mycophilum* (ATCC No. 20012).

References Cited

Tsukuda et al., J. Chem. Soc. D. Chem. Comm. 1969 (2):41.

JEROME D. GOLDBERG, Primary Examiner

U.S. Cl. X.R.

195—81